Figure 1:
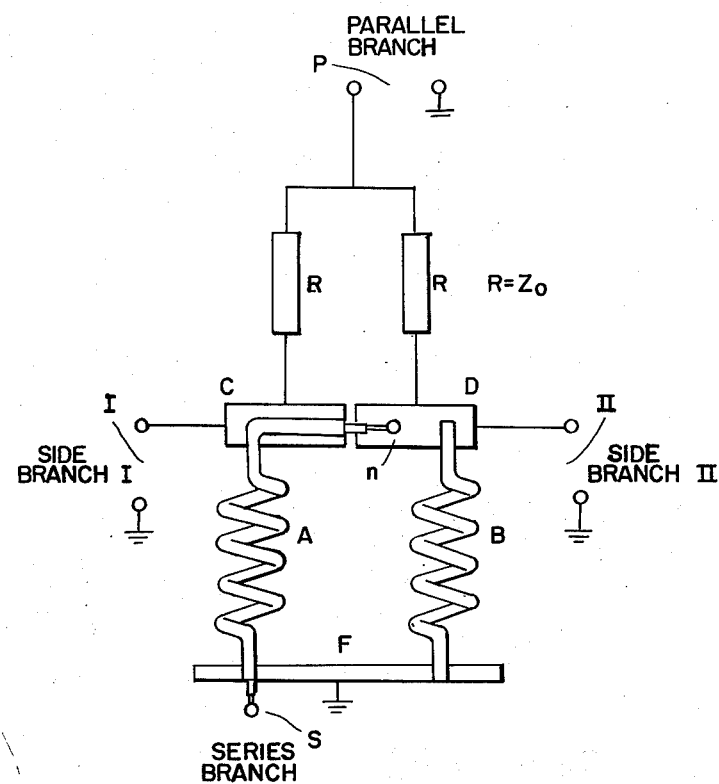

INVENTORS
ANDREW ALFORD
CHESTER B. WATTS JR.

ATTORNEYS

United States Patent Office 2,983,866
Patented May 9, 1961

2,983,866

AUTOMATIC IMPEDANCE PLOTTING DEVICE

Andrew Alford, 299 Atlantic Ave., Winchester, Mass., and Chester B. Watts, Jr., Winchester, Mass.; said Watts assignor to said Alford, Boston, Mass.

Filed Mar. 22, 1957, Ser. No. 647,872

6 Claims. (Cl. 324—58)

The present invention relates to an automatic impedance plotting device and in particular to a device of the type shown in co-pending application Serial No. 572,469, filed March 19, 1956, by Chester B. Watts, Jr., for an invention in a Polar Displayer.

In the present invention means are provided for automatically and continuous visually plotting and/or displaying an unknown impedance over a continuously varying wide frequency band in relation to a known reference impedance.

In addition, the present invention is directed toward an improved means for representing in polar vector form an unknown radio frequency voltage relative to a reference voltage. Such polar vector displayer means relates to an improved hybrid-like type of network such as shown in co-pending application Serial No. 623,560, filed November 21, 1956, by Andrew Alford for a Hybrid Type Network, which is substituted for the hybrids disclosed in the first mentioned application.

One of the principal problems connected with the construction of an automatic impedance plotter is that of maintaining the impedance and transfer characteritsics of the component parts uniform over the selected frequency range. Furthermore, the instrument should be accurate over as large a frequency range as possible. In the instrument described in application Serial No. 572,469 wide band coaxial hybrids were used in the circuitry. The resulting impedance plotter was limited to the particular frequency range of the hybrids which were utilized. Thus, if hybrids were provided having a range of between 120 and 240 megacycles, the frequency range of the instrument was no more than 2 to 1. One of the principal difficulties which have been encountered in the utilization of hybrids of the type indicated was that the SWR characteristics of hybrids of this type provided too great an impedance mismatch for the components of the circuit forming the instrument. The mismatch produced by the utilization of hybrids of this type cumulatively produced fluctuations in the amplitude scale factor and in the phase reference of the impedance display, as the RF frequency was varied. Fortunately the resulting error was always a percentage of the reflection coefficient of the unknown load being measured, and thus the accuracy in terms of impedance would improve as the match of the unknown was improved. While the instrument as therein disclosed is quite satisfactory for many purposes, a substantially improved instrument is provided through the utilization of such an instrument embodying hybrid-like structures such as shown in application Serial No. 623,560. For such an improved device provides an instrument having a much greater frequency range and much greater accuracy due to the better impedance matching of the hybrid-like networks. In addition to the advantages above enumerated of the particular combination herein described there is a purely physical advantage in the size of the components involved. In the present invention a relatively compact instrument is possible due to the compact nature of the hybrid-like networks. On the other hand, in the instrument previously contemplated the size was somewhat bulky, particularly for the lower RF frequency.

Figure 2:
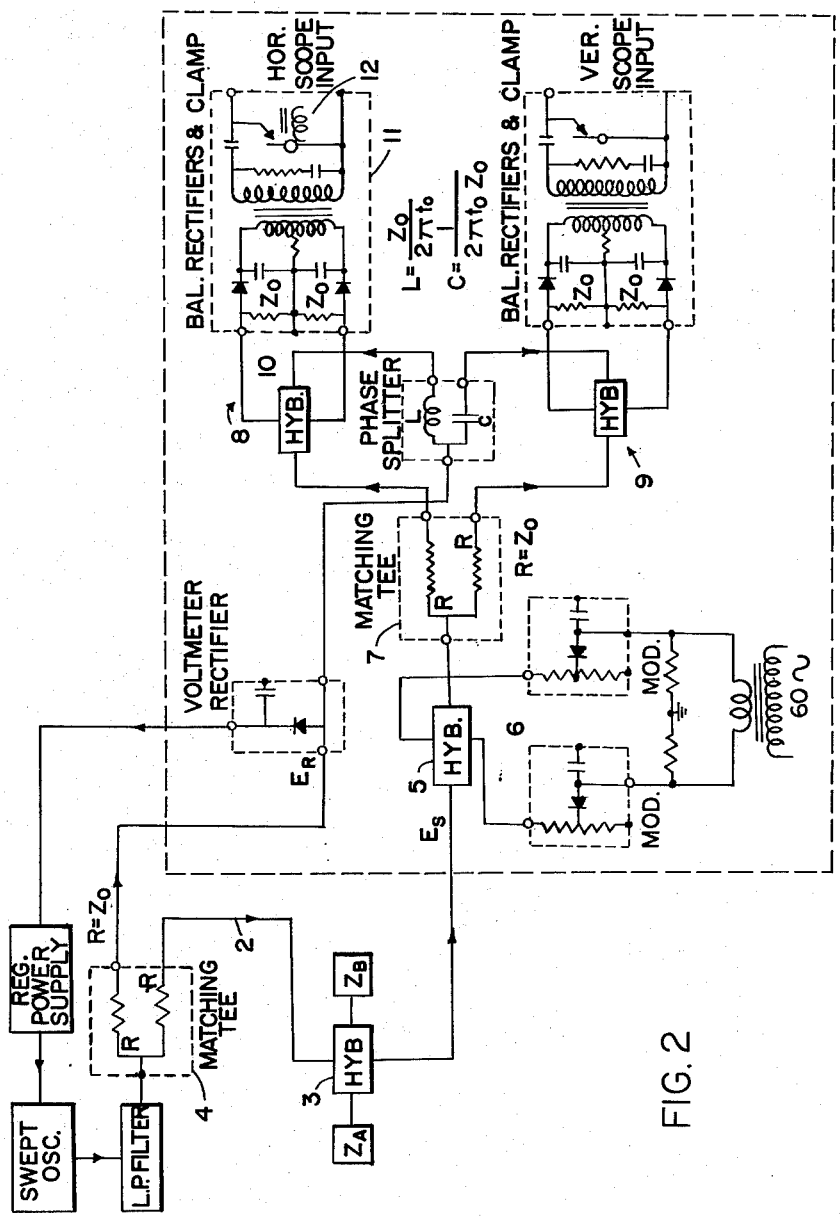

These and other objects of the present invention will be more clearly understood when considered in connection with the accompanying drawings in which:

Figure 1 is a schematic representation of a hybrid-like network of the type illustrated in co-pending application Serial No. 623,560, and Figure 2 is a schematic illustration of the circuit of the present invention.

Referring to Figure 1 there is a schematic representation of the components of the hybrid-like network illustrated in application Serial No. 623,560. In essence this hybrid type network provides a system having four coaxial terminal pairs or the equivalent, herein indicated as S, P, I, II. These letters indicate respectively the series branch, parallel branch and the two side branches. Each of these branches are connected to coaxial terminal lines in the impedance plotter in each of the hybrid-like networks therein in a manner hereinafter described. Considering the individual structure of each hybrid, however, it will be noted that terminal S is connected to one outside coaxial transmission line. The outer conductor of this particular coaxial transmission line is connected to the shield of the hybrid-type network at the input end, that is at the end nearest the S terminal. Since the shield remains at substantially zero potential, connection to the shield will sometimes be referred to as grounding. Within the shield there is positioned an inner transmission line, preferably coiled. This is indicated at A. A similar second coaxial transmission line also within the shield or just an outer conductor of a line, or a similarly shaped metal bar, is arranged in the neighborhood of the first coaxial line and is preferably in the form of a mirror image thereof, as indicated at B. The inner conductor of the first transmission line is coupled or connected to the outer conductor of the second transmission line or to the bar, if it is a bar, at one end thereof, as indicated at N. The opposite end of the bar or of the outer conductor of the second transmission line is connected to the outer conductor of the first line, and both are effectively connected to the shield at their ends nearest the S terminal by suitable means such as the conductive member F.

A second coaxial terminal as indicated at I has its inner conductor connected to the outer conductor of the first inner transmission line at the end of the latter furthest removed from terminal S, while the inner conductor of the third coaxial terminal as indicated at II is connected to the outer conductor of the second inner transmission line at its end furthest removed from terminal S. The inner conductor of the fourth coaxial terminal, indicated at P, is connected to two resistors R. The resistors R are in turn connected one each to the ends of the first and second mentioned inner transmission lines furthest from terminal S. The ends of the inner transmission lines may be referred to as "ungrounded" ends.

The outer conductors of all coaxial terminals are connected to a metal shield surrounding the network. The metal shield may be a closed metal enclosure or alternatively may comprise only two parallel metal plates spaced at a distance which is small, for example ½ inch in comparison with their other dimensions which may be, for example, 6 inches by 6 inches.

As indicated in the co-pending application, when terminating loads of impedance $Z_0$ are used, where R equals $Z_0$, the input to any branch of the hybrid-type network is matched to $Z_0$, without compensation, provided that first the characteristic impedance of the line within the balun coil A is also equal to $Z_0$ and second the reactances of the balun coils A and B are sufficiently large compared with $Z_0$. The reactance effects such as those due to the resistor leads and the terminal blocks C and D may be neglected.

It can be shown that the measurement of insertion loss through the hybrid-type network is sufficient to determine the magnitude of any reflection coefficient. This property permits the hybrid-type network to be used as a source of a signal in an automatic impedance plotter with the relative magnitude and phase being displayed on a Smith chart, the graph or chart actually displaying relative measures of reflection coefficients in polar display form.

For further amplification of the structure of hybrid-like network reference is made to the above noted co-pending application.

The automatic impedance plotter is quite similar to that described in co-pending application Serial No. 572,469 with the exception that hybrid-type networks are substituted for the hybrids therein described. For purposes of overall understanding, there is reproduced in Figure 2 a circuit diagram of the impedance plotter with the hybrid-type networks shown in block form. In the arrangement described, the RF frequency from the regulated power supply passes through the variable frequency oscillator and thence to a lowpass filter for the purpose of attenuating harmonics. The energy is then fed to the matching T junction. This junction is the virtual voltage source as far as the impedance measurement is concerned. This is because the junction voltage is taken as a magnitude and phase reference. The reference output of the matching T is taken into the polar displayer (enclosed by the large and dotted rectangle) and applied to a volt meter-rectifier. The output of the volt meter-rectifier is fed back to control the amplitude regulating power supply for the oscillator. Thus, the matching T junction voltage is held constant in magnitude.

Following the reference output of the matching T again into the polar displayer, the energy passes into the phase splitter where it is divided into two references, 90° apart. Each divided reference is applied to a hybrid-type network indicated by the abbreviation HYB, which is part of a phase selective detector circuit. The phase splitter performs well only over approximately a 2 to 1 frequency range. It is therefore made preferably as a plug-in unit. Different phase splitters may be selectively inserted for the particular range being tested, the remaining portion of the plotter being useful over a much greater range. Returning again to the matching T, looking down the other branch along the line 2, energy flows to the measuring hybrid-like network 3 at its input. For convenience in handling the matching T indicated at 4 may be built into the case of the measuring hybrid-like network. Since the hybrid-like network is working out of a matched source, the signal transferred through it is directly proportional to the reflection coefficient of the unknown load. The unknown load, it will be noted, is represented by $Z_x$ while the standard load is represented by $Z_s$. This signal in the measuring hybrid-like network flows into the polar displayer where it is applied to a square wave balanced modulator. The modulator comprises a hybrid-like network 5 whose side arm terminations are unequal, but reciprocal when normalized to $Z_0$. By means of high conductance germanium diodes, the side arm terminations are alternately switched, high and low, at a 60 cycle rate. This arrangement is illustrated at 6.

The modulated signal is divided into two equal parts in a matching T, as indicated at 7, and the two parts applied to the 2-phase selective detector circuits 8 and 9 respectively. Each phase selective detector comprises a hybrid-like network 10, for mixing the signal with the reference without interaction. The side branches are fed to balanced rectifiers where with the square wave modulation is recovered as indicated at 11. In each detector only that component of the signal which is in phase with the reference is detected. Thus, the detected square wave amplitudes are proportional to perpendicular components of the unknown load reflection coefficient. Proportionality is obtained from the detector by virtue of the signal being always small compared to the reference.

After detection, each of the 60 cycle square waves is amplified and applied to a mechanical chopper 12 which acts as a synchronous clamp to secure the center spot. The unclamped portion of the square wave is left free to swing above or below ground potential, depending upon the phase and amplitude of the signal. The two voltages are then applied to the axis of the D.C. oscilloscope to produce the display. Since these voltages contain D.C. components they may be used also to derive a standard 2-axis recorder provided the A.C. portions are filtered out.

A further detailed consideration of the overall structure of the impedance plotter may be obtained by reference to co-pending application Serial No. 572,469, with the understanding that this particular application discloses an impedance plotter utilizing a hybrid of conventional design rather than the hybrid-type network above disclosed.

Having now described our invention, we claim:

1. Apparatus for determining the phase and magnitude of an unknown signal relative to a reference signal comprising, a radio frequency oscillator whose frequency is swept over a relatively wide range, a low pass filter energized by said oscillator for suppressing signals whose frequency is above said range while substantially uniformly passing signals whose frequency is within said range, means responsive to the output signal delivered by said low pass filter for providing a control signal representative of the latter output signal amplitude, means for coupling said control signal to said oscillator to maintain the signal output from said low pass filter substantially constant independently of frequency, a circuit energized by said low pass filter output signal for providing said reference signal with its amplitude substantially constant independently of frequency and providing said unknown signal, first and second hybrids each having a series feed input, a parallel feed input and a pair of side terminals, means for applying substantially equal magnitude time quadrature components of said reference signal respectively to said parallel feed inputs, means for coupling said unknown signal jointly to said series feed inputs, means for combining the output signals delivered by said first hybrid pair of side terminals to provide a first output signal, and means for combining the output signal delivered by said second hybrid pair of side terminals to provide a second output signal, said first and second output signals being respectively representative of orthogonal components of the vector representation of said unknown signal phase and magnitude with respect to that of said reference signal.

2. Apparatus in accordance with claim 1 and further comprising, a controllable power supply which delivers an energizing potential to said oscillator, the amplitude of the output signal provided by said oscillator being related to the magnitude of said energizing potential, said control signal being applied to said power supply to control said energizing potential.

3. Apparatus in accordance with claim 1 wherein each of said hybrids comprises, first and second resistances connected from said parallel feed input to respective ones of said side terminals, a first coil formed by inner and outer coaxial conductors, said inner conductor being connected between said series input and one of said side terminals, and a second coil connected between one end of said outer conductor and said one side terminal, the other end of said outer conductor being connected to the other of said side terminals.

4. Apparatus in accordance with claim 1 wherein said circuit includes, a resistive pad coupling said low pass filter output to means for providing said reference signal quadrature components, a third hybrid having a series feed input, a parallel feed input and a pair of side terminals, said resistive pad also coupling said low pass filter output to one of said third hybrid series feed and parallel feed inputs, standard and unknown impedances connected to respective ones of said third hybrid side terminals, the other of said series feed and parallel feed inputs providing said unknown signal which signal is representative of the vector relationship between said standard and unknown impedances at the contemporaneous frequency of said radio frequency signal.

5. Apparatus in accordance with claim 4 and further comprising, a fourth of said hybrids, means for coupling said third hybrid other input to one of said fourth hybrid series feed and parallel feed inputs, a source of a modulating signal, means responsive to said modulating signal for periodically changing the impedance coupled to said fourth hybrid side terminals to provide said unknown signal modulated in accordance with said modulating signal upon the other of said fourth hybrid series feed and parallel feed inputs, and means for coupling the latter other input to both said first and second hybrid series feed inputs.

6. Apparatus for providing a representation of the phase and magnitude of an unknown impedance over a prescribed frequency range comprising, first, second, third, and fourth hybrids each having a series feed input, a parallel feed input, a pair of side terminals, first and second resistances connected from said parallel feed input to respective ones of said side terminals, a first coil formed by inner and outer coaxial conductors, said inner conductor being connected between said series input and one of said side terminals, and a second coil connected between one end of said outer conductor and said one side terminal, the other end of said outer conductor being connected to the other of said side terminals; a radio frequency oscillator whose frequency is swept over said prescribed range, a controllable power supply which delivers an energizing potential to said oscillator, the amplitude of the output signal provided by said oscillator being related to the magnitude of said energizing potential, a low pass filter energized by said oscillator for suppressing signals whose frequency is above said range while substantially uniformly passing signals whose frequency is within said range, means responsive to the output signal delivered by said low pass filter for providing a control signal representative of the latter output signal amplitude, means for coupling said control signal to said power supply to alter said energizing potential so as to maintain the signal output from said low pass filter substantially constant independently of frequency, a phase shift network having an input and a pair of outputs, the latter network responding to an applied input signal by providing equal amplitude time quadrature components thereof at said outputs, a first resistive pad coupling said low pass filter output to said phase shift network input, the latter network outputs being coupled respectively to said first and second hybrid parallel feed inputs, said first resistive pad also coupling said low pass filter output to one of said third hybrid series feed and parallel feed inputs, standard and unknown impedances connected to respective ones of said third hybrid side terminals, the other of said third hybrid series feed and parallel feed inputs providing an unknown signal, means for coupling said third hybrid other input to one of said fourth hybrid series feed and parallel feed inputs, a source of a modulating signal, means responsive to said modulating signal for periodically changing the impedance coupled to said fourth hybrid side terminals to provide said unknown signal modulated in accordance with said modulating signal upon the other of said fourth hybrid series feed and parallel feed inputs, a resistive matching pad coupling said fourth hybrid other output to the series feed inputs of said first and second hybrids, first and second transformers each having a primary and secondary, first and second balanced rectifying circuits respectively coupling said first and second hybrid side terminal pairs to said first transformer primary and said second transformer primary respectively, first and second output terminals respectively coupled to said first and second transformer secondaries, and means responsive to said modulating signal for periodically interrupting the coupling from said secondaries to said output terminals.

References Cited in the file of this patent
UNITED STATES PATENTS

| | | |
|---|---|---|
| 2,462,841 | Bruck et al. | Mar. 1, 1949 |
| 2,508,456 | Hansen | Apr. 4, 1950 |
| 2,554,164 | Wojciechowski | May 22, 1951 |
| 2,594,167 | Herold | Apr. 22, 1952 |
| 2,609,447 | Graef | Sept. 2, 1952 |
| 2,667,576 | Staschover | Jan. 26, 1954 |
| 2,688,694 | Evertsz | Sept. 7, 1954 |
| 2,735,064 | Salzberg | Feb. 14, 1956 |
| 2,735,981 | Schutz et al. | Feb. 21, 1956 |
| 2,754,480 | Wanka | July 10, 1956 |
| 2,789,271 | Budenbom | Apr. 16, 1957 |
| 2,790,143 | Kyhl | Apr. 23, 1957 |